(12) United States Patent
Barth et al.

(10) Patent No.: US 10,396,846 B1
(45) Date of Patent: Aug. 27, 2019

(54) ADAPTIVE DECODING OF SPREAD SPECTRUM SIGNALS USING MULTIPLE CORRELATOR PEAKS

(71) Applicant: Cisco Technology, Inc., San Jose, CA (US)

(72) Inventors: Ragnvald Balch Barth, Oslo (NO); Knut Inge Hvidsten, Oslo (NO); Michael A. Ramalho, Lakewood Ranch, FL (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/158,794

(22) Filed: Oct. 12, 2018

(51) Int. Cl.
| | |
|---|---|
| *H04B 1/7075* | (2011.01) |
| *H04B 1/7117* | (2011.01) |
| *H04B 17/336* | (2015.01) |
| *H04B 1/7105* | (2011.01) |

(Continued)

(52) U.S. Cl.
CPC ....... *H04B 1/70752* (2013.01); *H04B 1/7105* (2013.01); *H04B 1/7117* (2013.01); *H04B 1/71632* (2013.01); *H04B 17/336* (2015.01); *H04B 1/7172* (2013.01)

(58) Field of Classification Search
CPC combination set(s) only.
See application file for complete search history.

(56) References Cited

U.S. PATENT DOCUMENTS

| | | |
|---|---|---|
| 5,142,656 A | 8/1992 | Fielder et al. |
| 5,184,316 A | 2/1993 | Sugiyama |
| 5,301,255 A | 4/1994 | Nagai et al. |

(Continued)

FOREIGN PATENT DOCUMENTS

CN 104753561 A 7/2015

OTHER PUBLICATIONS

T. Yoshioka, et al., "Making Machines Understand Us in Reverberant Rooms", [Robustness against reverberation for automatic speech recognition], Fundamental Technologies in Modem Speech Recognition, IEEE Signal Processing Magazine, Nov. 2012, 13 pages.

(Continued)

*Primary Examiner* — Freshteh N Aghdam
(74) *Attorney, Agent, or Firm* — Edell, Shapiro & Finnan, LLC

(57) ABSTRACT

Time-offset, time-overlapping signals are received. The signals each include a pilot code, and at least some of the signals each include a user code occupying a time slot time-synchronized to a respective pilot code. Time-offset cross-correlation peaks for respective ones of the pilot codes are generated, each cross-correlation peak indicating a respective one of the time slots. For each time slot a respective projection vector including user code projections each indicative of whether a respective user code of known user codes is present in the time slot is generated. Particular ones of the projection vectors are selectively combined into an aggregate projection vector of aggregate user code projections, such that the aggregate projection vector has a signal-to-noise ratio (SNR) greater than the projection vectors individually. The user code is selected from among the known user codes based on the aggregate user code projections of the aggregate projection vector.

20 Claims, 11 Drawing Sheets

(51) Int. Cl.
*H04B 1/7163* (2011.01)
*H04B 1/717* (2011.01)

(56) References Cited

U.S. PATENT DOCUMENTS

| | | | |
|---|---|---|---|
| 5,349,549 A | 9/1994 | Tsutsui | |
| 5,357,594 A | 10/1994 | Fielder | |
| 5,363,096 A | 11/1994 | Duhamel et al. | |
| 5,394,473 A | 2/1995 | Davidson | |
| 5,471,558 A | 11/1995 | Tsutsui | |
| 5,479,562 A | 12/1995 | Fielder et al. | |
| 5,506,623 A | 4/1996 | Sako et al. | |
| 5,619,197 A | 4/1997 | Nakamura | |
| 5,636,324 A | 6/1997 | Teh et al. | |
| 5,878,076 A * | 3/1999 | Siedenburg | H04B 1/70753 375/141 |
| 5,913,186 A | 6/1999 | Byrnes et al. | |
| 5,943,329 A * | 8/1999 | Ohgoshi | H04B 7/2628 370/335 |
| 6,141,337 A | 10/2000 | Uta et al. | |
| 6,512,785 B1 * | 1/2003 | Zhou | H04B 1/7093 375/143 |
| 6,977,956 B2 * | 12/2005 | Ando | H04B 1/7097 370/335 |
| 7,852,318 B2 | 12/2010 | Altman | |
| 8,212,854 B2 | 7/2012 | Marton et al. | |
| 8,259,603 B2 | 9/2012 | Kuroda et al. | |
| 10,003,377 B1 * | 6/2018 | Ramalho | H04B 1/7103 |
| 2003/0043775 A1 | 3/2003 | Kikuchi | |
| 2004/0071195 A1 | 4/2004 | Huang et al. | |
| 2018/0175903 A1 | 6/2018 | Ramalho et al. | |

OTHER PUBLICATIONS

K.K. Wong, et al., "Spread Spectrum Techniques for Indoor Wireless IR Communications", Optical Wireless communications, IEEE Wireless Communications, Apr. 2003, 11 pages.

H. Delic, et al., "The Prometheus Orthonormal Set for Wideband CDMA", IEEE MELECON 2004, May 12-15, 2004, Dubrovnik, Croatia, 4 pages.

Wikipedia page, "Rake receiver", https://en.wikipedia.org/wiki/Rake_receiver, downloaded from the Internet on Oct. 8, 2018, 2 pages.

Paul Hursky, et al., "Channel effects on DSSS Rake receiver performance", SAIC, Ocean Acoustics Conference, San Diego, CA, Mar. 2004, 34 pages.

W. Ouyang, "Fast Algorithm for Walsh Hadamard Transform on Sliding Windows", IEEE Transactions on Pattern Analysis and Machine Intelligence, vol. 32, Issue 1, Jan. 2010, 16 pages.

Eric Jacobsen, "Understanding and Implementing the Sliding DFT", Anchor Hill Communications, www.anchorhill.com, Apr. 2015, 5 pages.

M. An, et al., "Pons, Reed-Muller Codes, and Group Algebras", Computational noncommutative Algebra and Applications, pp. 155-196, part of the NATO Science Series II: Mathematics, Physics and Chemistry book series, NAII, vol. 136), 2004, 42 pages.

A. la Cour-Harbo, "On the Rudin-Shapiro transformation", ScienceDirect, Appl. Comput. Harmon. Anal. 24 (2008) 310-328, www. sciencedirect.com, 19 pages.

* cited by examiner

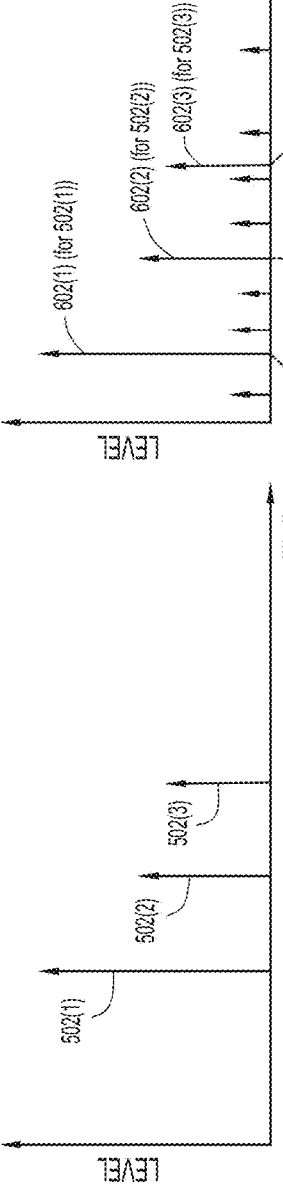
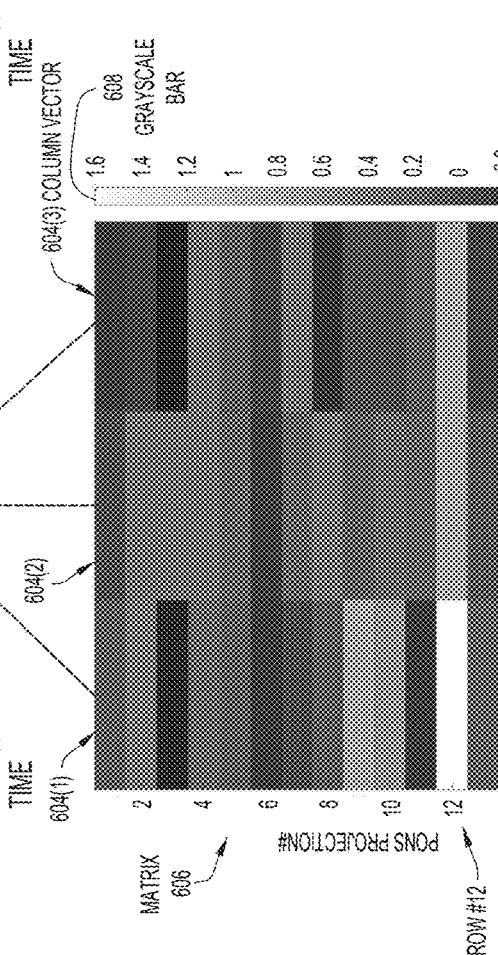
FIG.5
FIG.6

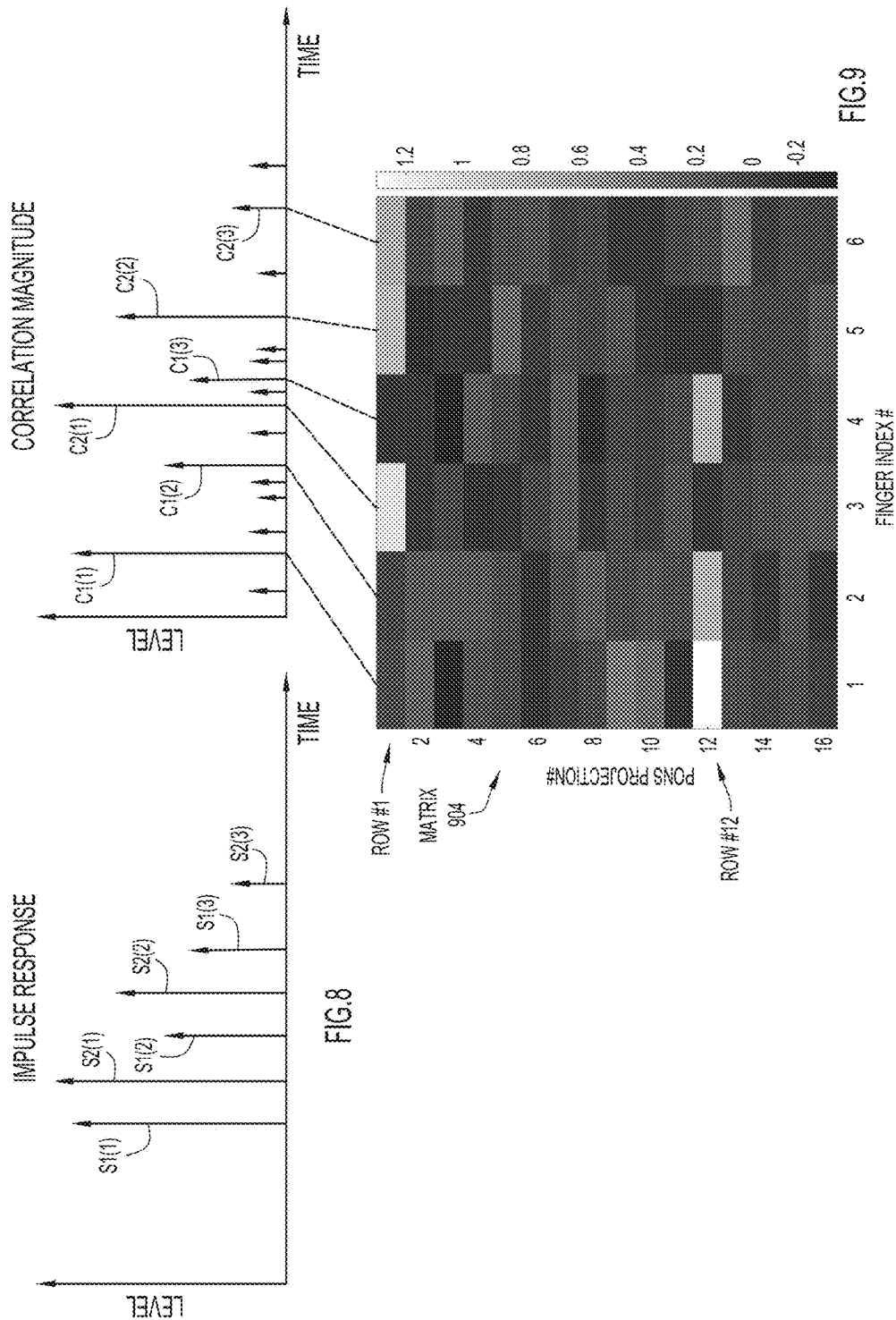

ADAPTIVE DECODING OF SPREAD SPECTRUM SIGNALS USING MULTIPLE CORRELATOR PEAKS

TECHNICAL FIELD

The present disclosure relates generally to decoding spread spectrum signals.

BACKGROUND

When a transmitter transmits a desired signal into a room, reflections of the desired signal result in self-interference at a receiver located in the room. Also, signals from other nearby transmitters add further interference at the receiver. The combination of self-interference and the further interference deters the receiver from decoding the desired signal correctly. When the desired signal and the further interference include spread spectrum signals, the resulting combined interference represents a near worse-case interference scenario, but one that is common-place.

BRIEF DESCRIPTION OF THE DRAWINGS

FIG. 5 is a plot of energy against time for energy arriving at a microphone of the spread spectrum acoustic receiver in accordance with a typical acoustic impulse response of a room, according to an example embodiment.

FIG. 6 is an illustration of correlation results (i.e., correlation magnitudes) and corresponding projection vectors produced by the spread spectrum acoustic receiver responsive to received energy that follows the acoustic impulse response of FIG. 5, according to an example embodiment.

FIG. 8 is a plot of two impulse responses for the energy associated with the spread spectrum signals from the two transmitters arriving at the spread spectrum receiver in FIG. 7, according to an example embodiment.

FIG. 9 is an illustration of the correlation results and corresponding projection vectors produced by the spread spectrum receiver of FIG. 7 responsive to received energy that follows the impulse responses of FIG. 8, according to an example embodiment.

DESCRIPTION OF EXAMPLE EMBODIMENTS

Overview

Time-offset, time-overlapping signals are received. The signals each include a pilot code that is the same across the signals, wherein and at least some of the signals each further includes a user code occupying a time slot time-synchronized to a respective one of the pilot codes. More generally, a set of one or more user codes occupy a corresponding set of one or more time slots time-synchronized to the respective one of the pilot codes. Time-offset cross-correlation peaks for respective ones of the pilot codes are generated. Each cross-correlation peak indicates a respective one of the time slots. For each time slot a respective projection vector including user code projections each indicative of whether a respective user code among known user codes is present in the time slot is generated. Particular ones of the projection vectors are selectively combined into an aggregate projection vector of aggregate user code projections, such that the aggregate projection vector has a signal-to-noise ratio (SNR) greater than the projection vectors individually. The user code is selected from among the known user codes based on the aggregate user code projections of the aggregate projection vector.

Example Embodiments

Figure 1:
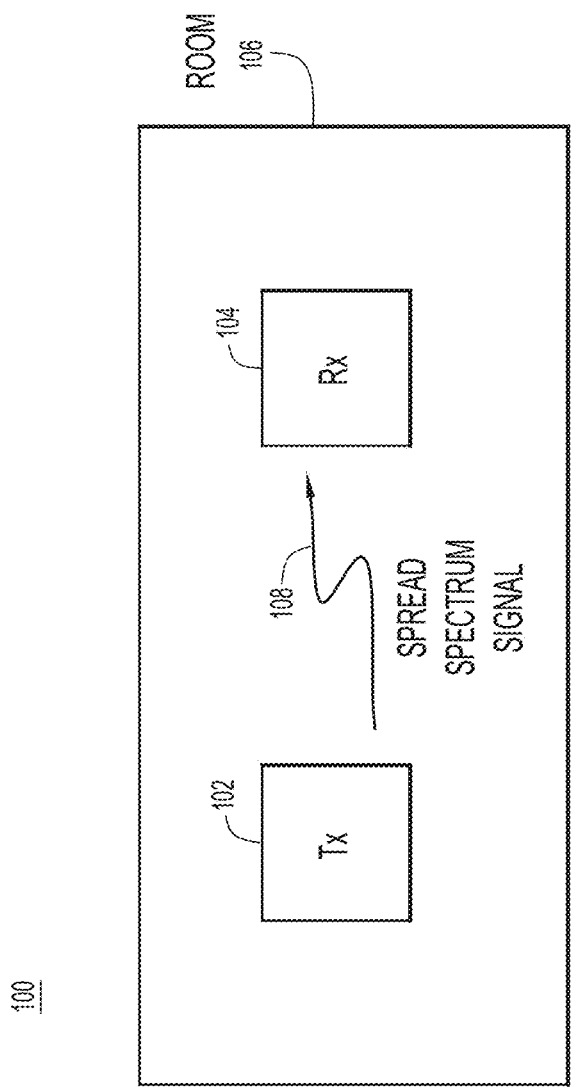
FIG. 1 is a block diagram of a spread spectrum communication system including a spread spectrum transmitter (TX) and a spread spectrum receiver (RX), according to an example embodiment.

With reference to FIG. 1, there is a block diagram of an acoustic spread spectrum communication system 100 including a spread spectrum transmitter (TX) 102 and spread spectrum receiver (RX) 104 deployed in a room 106. Transmitter 102 generates and transmits into room 106 a spread spectrum acoustic signal or sequence 108 including a pilot code and a set of one or more user codes (e.g., 1, 4, 8, or any other integer number of user codes) that is time-synchronized to the pilot code. Receiver 104 receives spread spectrum acoustic signal 108, synchronizes receiver timing to the pilot code in the received signal, and recovers/decodes the one or more user codes from the received signal based on the receiver timing. That is, receiver 104 decodes the one or more user codes from the received signal based on the pilot code. Embodiments presented below provide different techniques that may be used by receiver 104 to decode the user codes from the received signal.

System 100 may employ Orthonormal Set (PONS) codes (referred to as "PONS codes" or "PONS sequences") for the pilot codes and the user codes. PONS codes are based on Shapiro polynomials, which have coefficients+/−1. That is, each PONS code includes a sequence of coefficients in which each of the coefficients is +/−1. PONS codes are generated based on a PONS construction. The PONS construction expands the Shapiro polynomials via a concatenation rule defined below. Working with sequences formed by the polynomial coefficients, various PONS matrices are as follows.

Starting with:

$$P_1 = \begin{bmatrix} P_{1,1} \\ Q_{1,1} \end{bmatrix} = \begin{bmatrix} 1 & 1 \\ 1 & -1 \end{bmatrix},$$

Concatenation leads to:

$$P_2 = \begin{bmatrix} P_{2,1} \\ Q_{2,1} \\ P_{2,2} \\ Q_{2,2} \end{bmatrix} = \begin{bmatrix} P_{1,1} & Q_{1,1} \\ P_{1,1} & -Q_{1,1} \\ Q_{1,1} & P_{1,1} \\ -Q_{2,2} & P_{1,1} \end{bmatrix} = \begin{bmatrix} 1 & 1 & 1 & -1 \\ 1 & 1 & -1 & 1 \\ 1 & -1 & 1 & 1 \\ -1 & 1 & 1 & 1 \end{bmatrix},$$

and letting $$P_{m-1} = \begin{bmatrix} P_{m-1,1} \\ Q_{m-1,1} \\ \vdots \\ P_{m-1,2^{m-2}} \\ Q_{m-1,2^{m-2}} \end{bmatrix}$$

which is of dimensions $2^{m-1} \times 2^{m-1}$ with each row being one of the $2^{m-1}$ PONS sequences, the $2^m \times 2^m$ PONS matrix is obtained by $$P_m = \begin{bmatrix} P_{m,1} \\ Q_{m,1} \\ P_{m,2} \\ Q_{m,2} \\ \vdots \\ P_{m,2^{m-1}-1} \\ Q_{m,2^{m-1}-1} \\ P_{m,2^{m-1}} \\ Q_{m,2^{m-1}} \end{bmatrix} = \begin{bmatrix} P_{m-1,1} & Q_{m-1,1} \\ P_{m-1,1} & -Q_{m-1,1} \\ Q_{m-1,1} & P_{m-1,1} \\ -Q_{m-1,1} & P_{m-1,1} \\ \vdots & \vdots \\ P_{m-1,2^{m-2}} & Q_{m-1,2^{m-2}} \\ P_{m-1,2^{m-2}} & -Q_{m-1,2^{m-2}} \\ Q_{m-1,2^{m-2}} & P_{m-1,2^{m-2}} \\ -Q_{m-1,2^{m-2}} & P_{m-1,2^{m-2}} \end{bmatrix}.$$

Thus, in one example of a 4×4 PONS matrix:

$$P_{2^2,2^2} = \begin{bmatrix} 1 & 1 & 1 & -1 \\ 1 & 1 & -1 & 1 \\ 1 & -1 & 1 & 1 \\ -1 & 1 & 1 & 1 \end{bmatrix} \quad \begin{array}{l} P_{2^2,2^2} * P_{2^2,2^2}^T = 4 * I \\ P_{2^K,2^K} * P_{2^K,2^K}^T = 2^K * I \end{array}$$

and any row/column can be negated and still have $P*P^T = (2^K)*I$.

Figure 2A:
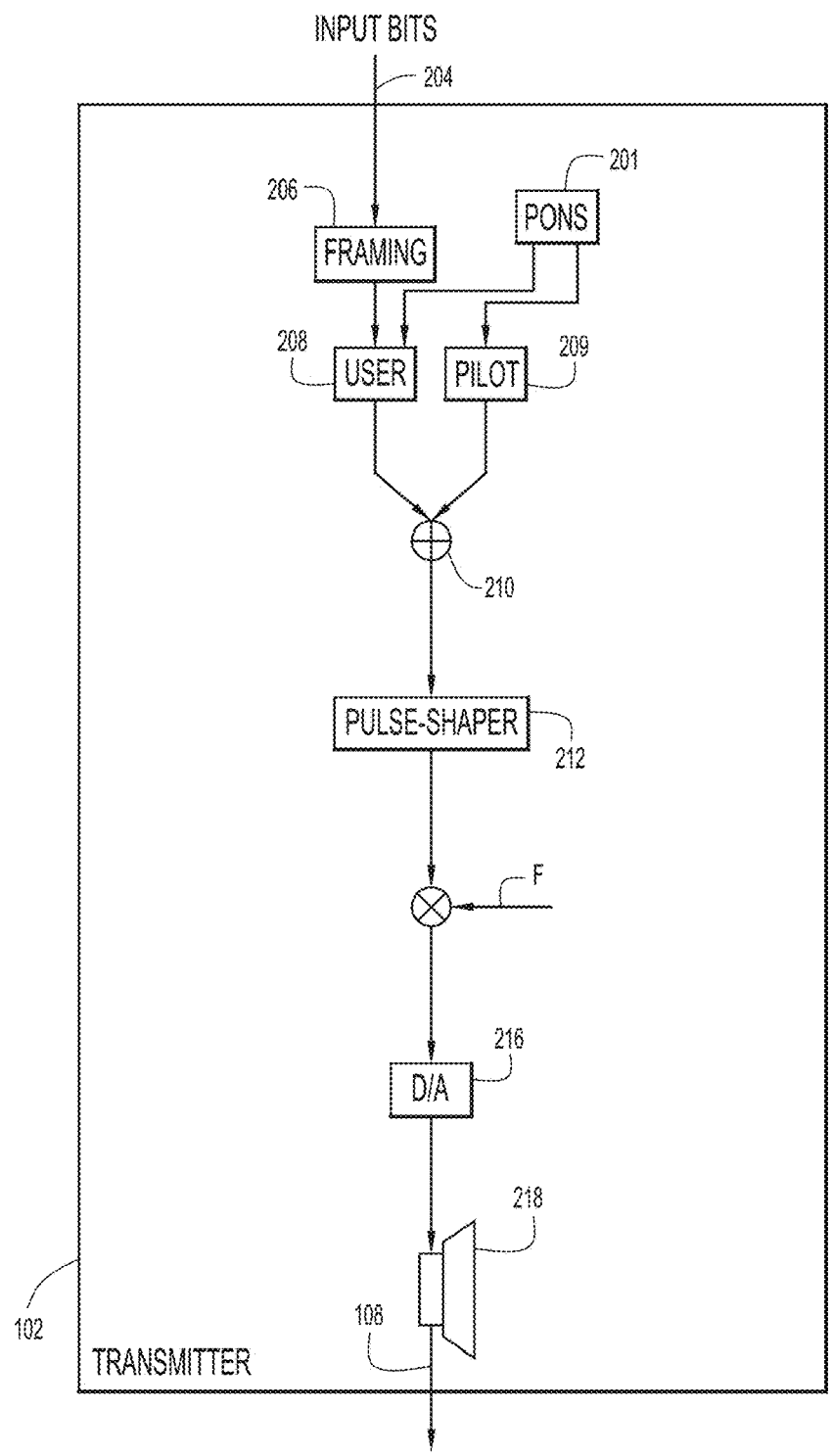
FIG. 2A is a block diagram of a spread spectrum acoustic transmitter in which pilot codes and user codes based on Prometheus Orthonormal Set (PONS) codes may be used, according to an example embodiment.

With reference to FIG. 2A, there is a block diagram of transmitter 102 according to an embodiment. Transmitter 102 includes a code memory 201 to store a set of predetermined PONS codes used by the transmitter to generate spread spectrum acoustic signal 108. Transmitter 200 receives a stream or sequence of digital bits 204. A framer 206 frames the bits into groups/frames of bits, and a user encoder 208 encodes the groups of bits into symbols represented as user codes selected from the set of predetermined PONS codes. A pilot generator 209 generates a pilot code as a sequence of PONS codes also selected from memory 201. For example, generator 209 may concatenate multiple PONS codes from memory 201 into the pilot code. An adder 210 combines and time-synchronizes the user codes with the pilot code to produce a combined, digitized baseband signal. A pulse-shaper/up-sampler 212 employs a root-raised cosine (RRC) filter to generate a digital baseband signal. An upconverter 214 frequency-upconverts the combined, digitized baseband signal based on a local oscillator frequency F, to produce a digitized, upconverted signal. A "real( )" operation discards imaginary components of the digitized, upconverted signal, leaving only real components of the signal. A digital-to-analog (D/A) 216 converts the digitized, upconverted signal to an analog upconverted signal, and an amplifier and loudspeaker 218 converts the aforementioned signal to acoustic signal 108 (i.e., the spread spectrum signal) and transmits the acoustic signal. Acoustic signal 108 includes one or more user codes synchronized to the pilot code. Acoustic signal 108 may have a frequency spectrum in an audible frequency band of human hearing (e.g., up to 20 kHz), an ultrasound frequency band (e.g., above 20 kHz), or a frequency band that spans both the audible and the ultrasound frequency bands.

Figure 2B:
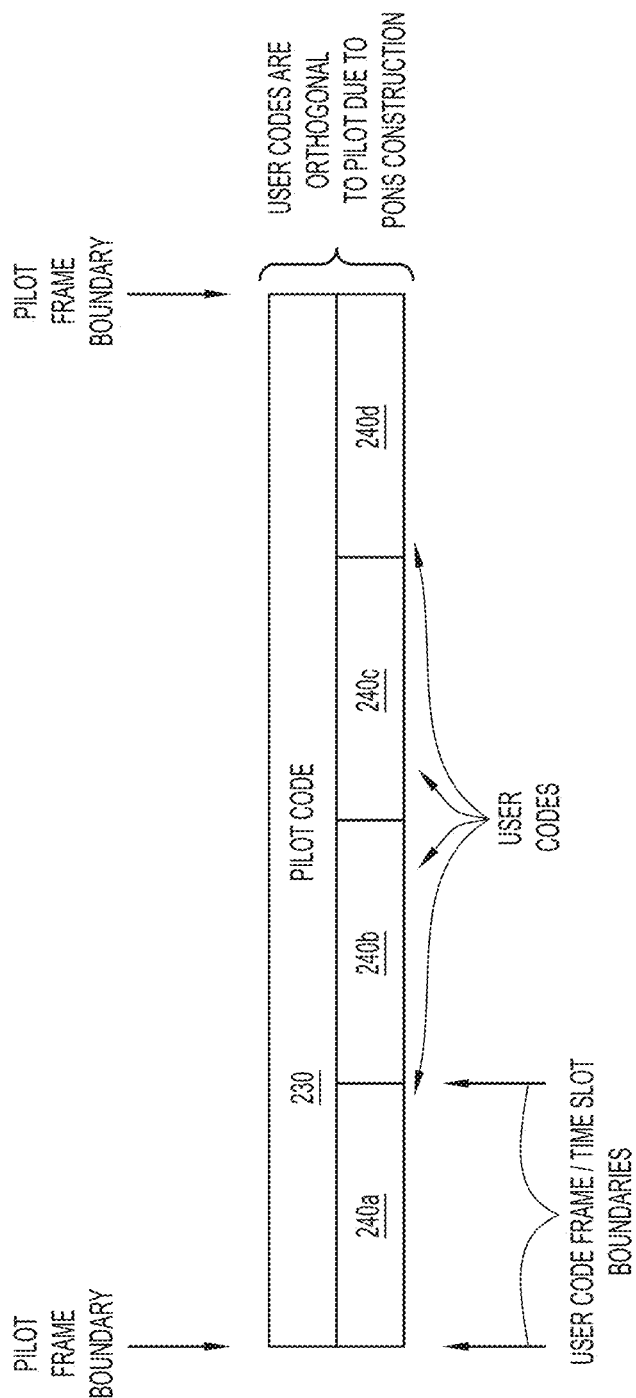
FIG. 2B is an illustration of a timing relationship between a pilot code and user codes generated by the spread spectrum acoustic transmitter, according to an embodiment.

FIG. 2B is an illustration of an example timing relationship between a pilot code 230 represented as a sequence of 4 contiguous PONS codes, and a sequence of 4 contiguous user codes 240a, 240b, 240c, and 240d as would exist in baseband signals of transmitter 102 and correspondingly in acoustic signal 108. Pilot code 230 spans a pilot frame and each of user codes 240i spans/occupies a respective user code frame or time slot in acoustic signal 108. With the illustrated timing relationship in which the full extent of user codes 240a-240d begins and ends in time alignment with pilot code 230, and due to the properties of the PONS construction, each user code 240i is orthogonal to the portion of the pilot code of the same length. More generally, transmitter 102 transmits each pilot code to span a set of M user codes, where M may be any integer, such as 1, 4, 8, 10, 16, and so on, in which case the set of M user codes are said to belong to the transmitted pilot code.

Figure 3:
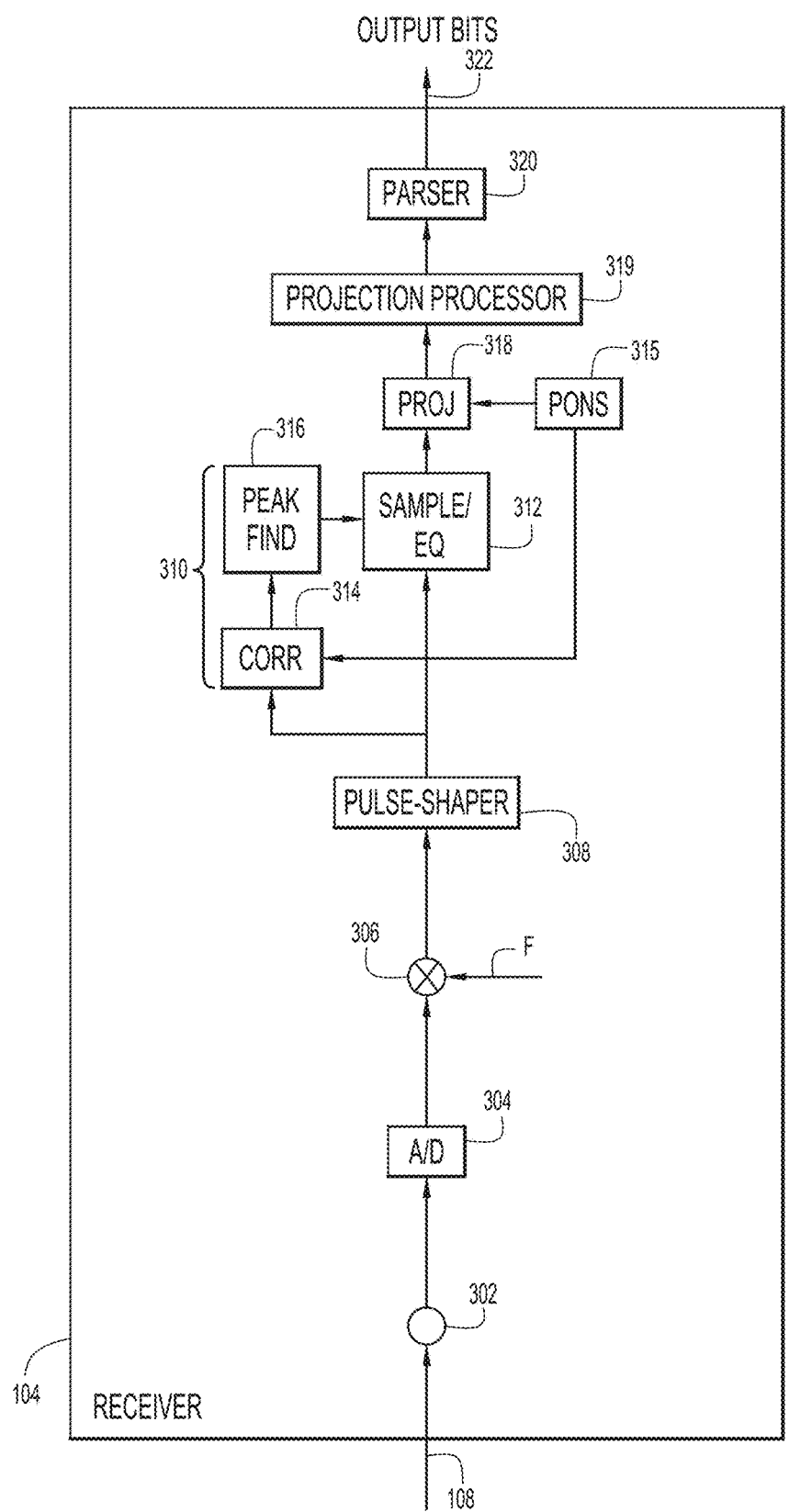
FIG. 3 is a block diagram of a spread spectrum acoustic receiver that receives and processes a spread spectrum acoustic signal using a correlator to recover user codes, according to an example embodiment.

With reference to FIG. 3, there is a block diagram of receiver 104 that processes transmitted acoustic signal 108 to recover the bits from the symbols in the acoustic signal, according to an embodiment. Receiver 104 includes a microphone assembly 302 to detect acoustic signal 108, an analog-to-digital (A/D) converter 304 to digitize the detected acoustic signal, and a down-converter 306 to frequency down-convert the digitized, detected acoustic signal based on a local oscillator frequency F, to produce a digitized baseband signal. A pulse shaper 308 filters the digitized baseband signal to produce a filtered version of the digitized baseband signal and provides samples thereof to a correlator assembly 310 and a sampler/equalizer 312.

Correlator assembly 310 detects the pilot code in the digitized baseband signal to establish timing synchronization with the digitized baseband signal, which enables receiver 108 to demodulate the user codes in the digitized baseband signal. Correlator assembly 310 includes a correlator 314 ("Corr") followed by a peak detector 316 ("peak find"). Correlator 314 receives, from a code memory 315 that stores the same set of predetermined PONS codes as transmitter code memory 201, a replica code that matches (i.e., is a replica of) the pilot code. Correlator 314 correlates sequential samples of the digitized baseband signal against the replica code to produce sequential correlation results, i.e., correlation amplitudes. Peak detector 316 detects peaks (i.e., cross-correlation peaks) and their timing in the correlation results as time progress. The timing of the peaks represents a synchronization point to be used by receiver 104 to demodulate the user codes from their respective time slots. That is, receiver 104 uses the peak magnitude timing for user code timing recovery, and then demodulation/recovery of the user codes.

Sampler/equalizer 312 selects a subset of samples corresponding to one group/frame of samples and performs a complex phase rotation according to a peak magnitude and associated complex phase angle provided by correlator assembly 310, to produce baseband spread spectrum chips (i.e., user code energy) spanning the time slot for and representative of each user code. For each user code time slot, a projector 318 projects each PONS code from the set of predetermined PONS codes onto the user code energy in the time slot (e.g., using a dot product/inner product function that applies PONS code samples against chip samples in the time slot), to produce a respective/individual user code projection corresponding to each predetermined PONS code. Collectively, the user code projections represent, for the given user code time slot, a vector of user code projections (also referred to as a "projection vector" or a "column vector") having user code projections as row elements. The row indexes of the user code projections map to/indicate correspond ones of the PONS codes. Projector 318 provides the projection vector for each user code time slot to projection processor 319. In accordance with embodiments presented herein, projection processor 319 recovers the user code transmitted by transmitter 102 from the projection vectors. Receiver 104 maps the recovered user codes to a stream of groups of bits. Parser 320 de-frames the bit stream to recover output bits 322 representative of input bits 204.

Figure 4:
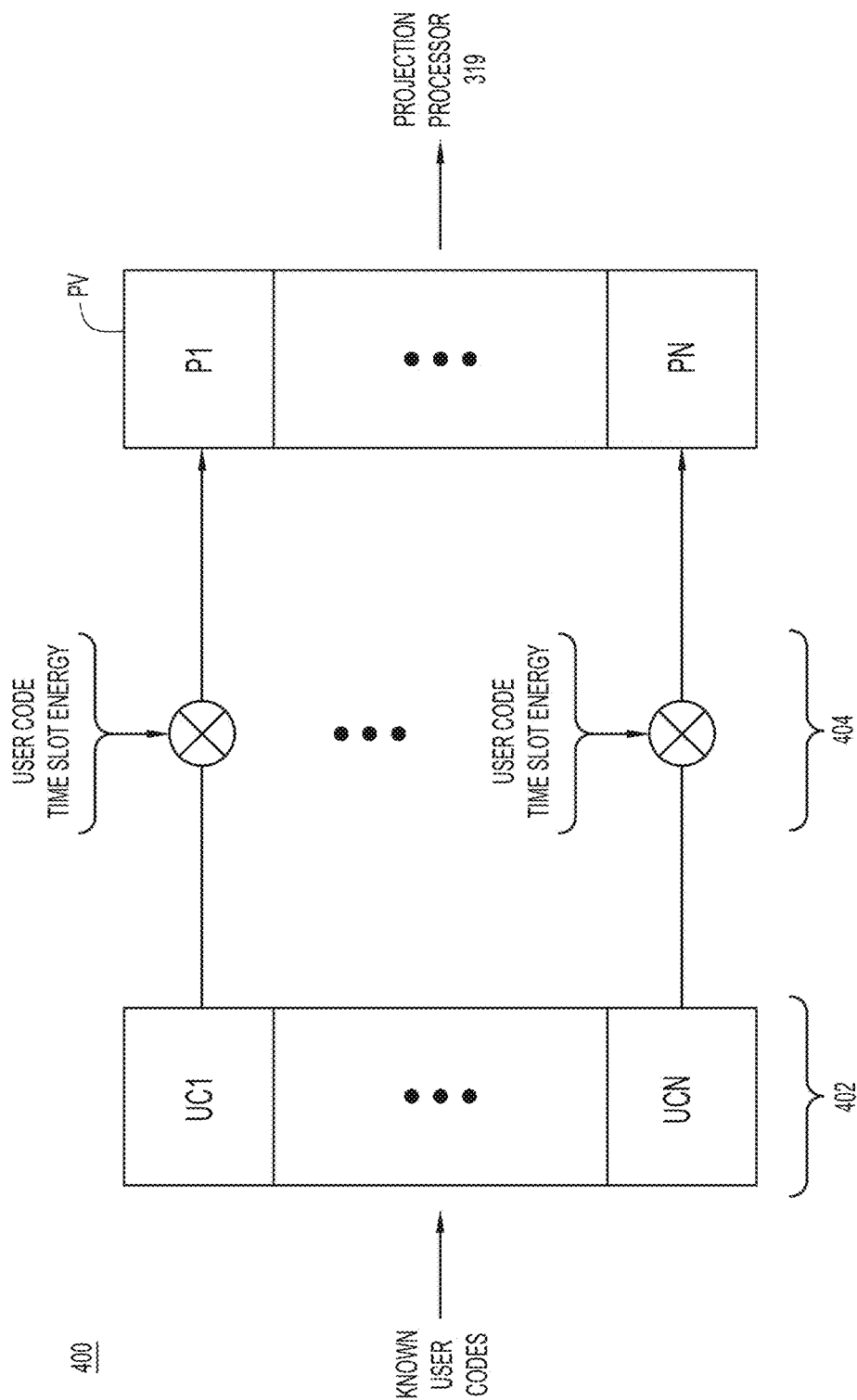
FIG. 4 is an illustration of operations performed by a projector of the spread spectrum acoustic receiver to produce a projection vector, according to an example embodiment.

With reference to FIG. 4, there is an illustration of example operations 400 performed by projector 318 to produce a projection vector PV for a given time slot (i.e., a user code time slot) occupied by a given user code. Operations 400 are repeated for each of M (user code) time slots occupied by corresponding ones of M user codes (e.g., in the example of FIG. 2B, M=4). At 402, projector 318 receives a set of known user codes UC1-UCN from code memory 315, where N=16 in one example. At 404, projector 318 individually projects each user code UCi onto energy in the given time slot, to produce a corresponding user code projection Pi among a set of user code projections P1-PN produced at operation 404. The magnitude of user code projection Pi indicates a likelihood that user code UCi actually occupies the time slot, i.e., is the given user code. The higher the magnitude of user code projection Pi relative to the other user code projections, the more likely it is that the user code Pi occupies the time slot (i.e., is the given user code), and vice versa. Collectively, user code projections P1-PN form projection vector PV.

Transmitter 102 and receiver 104 are described above as transmitting, receiving, and processing acoustic signals by way of example, only. It is understood that embodiments presented herein may be used with transmitters and receivers that transmit, receive, and process at any frequency, signals that include acoustic waves propagated through any media, including air or other media, such as water, electromagnetic waves (e.g., radio), and signals stored or encoded on physical storage media, including memory magnetic hard drives and so. Moreover, the embodiments presented herein apply equally well to non-acoustic spread spectrum signals.

Returning to FIG. 1, when transmitter 102 transmits into room 106 spread spectrum signal 108 including one pilot code and one user code synchronized to the pilot code, energy associated with the transmitted signal arrives at microphone 302 of receiver 104 in accordance with an acoustic impulse response of the room. FIG. 5 is an illustration of energy (magnitude) against time arriving at microphone 302 (i.e., received at the microphone) in accordance with a typical acoustic impulse response. The energy includes 3 main peaks 502(1), 502(2), and 502(3) separated from each other in time, i.e., time-offset from each other. Energy peaks 502(1), 502(2), and 502(3) represent differently time-shifted versions of spread spectrum signal 108 as originally transmitted. Reflections of spread spectrum signal 108 from walls of the room and from objects in the room result in distinct copies or instances of signal 108 that arrive at the microphone as early reflections 502(2) and 502(3). Each has an associated delay, level, and phase. Later reverberation ("late reflections") will be increasingly dense with small contributions from each reflection.

For the typical impulse response, direct sound represented at energy peak 502(1) dominates relative to early reflections 502(2) and 502(3) and the late reflections, due in part to an unobstructed line-of-sight between transmitter 102 and receiver 104. This corresponds to the communication concept of Rician fading. Alternatively, the direct sound may be significantly attenuated, either by objects obstructing the line of sight, or because of transmitter speaker/receiver microphone nulls for the relevant spatial direction and frequency range. In this case, an acoustic impulse response may include a number of somewhat closely spaced early reflections of approximately equal magnitude that dominate the impulse response, which corresponds to the radio communication concept of Rayleigh fading.

When receiver 104 receives the energy transmitted by transmitter 102, correlator 314 correlates the received energy against the replica of the pilot code, to produces correlation results in the form of a sequence of correlation magnitudes. The correlation results represent an estimate of the impulse response at a random time-shift, with added errors arising from correlation properties of the pilot code and the user codes, and the fact that the pilot code represents an imperfect Dirac delta function, which causes spreading of energy in the correlation results.

With reference to FIG. 6, there is an illustration of the correlation results (i.e., correlation magnitudes) produced against time when the received energy follows the impulse response of FIG. 5. As shown in FIG. 6, the correlation results include three main, differently time-shifted, correlation peaks 602(1), 602(2), and 602(3) corresponding one-to-one to energy peaks 502(1), 502(2), and 502(3). The correlation results also include several smaller correlation peaks resulting from the added errors mentioned above. Receiver 104 identifies a set of M respective user code time slots corresponding to each of correlation peaks 602(1), 602(2), and 602(3). For each correlation peak 602(i), projector 318 generates a respective projection vector for each of the M time slots identified by the correlation peak 602(i) (e.g., a projection vector for the first of the M time slots belonging to each correlation peak 602(i), for the second of the M time slots belonging to each correlation peak 602(i), and so on, for the M time slots). In the example of FIG. 6, projector 318 generates projection vectors 604(1), 604(2), and 604(3) for one of the M time slots (e.g., the first of the M time slots) corresponding to correlation peaks 602(1), 602(2), and 602(3).

Following the example described above in connection with FIG. 4, projector 318 projects N=16 known user codes UC1-UC16 identified by row indexes 1-16, individually, onto:

a. The energy occupying a first of the M time slots identified by correlation peak 602(1), to produce projection vector 604(1) (and also onto the energy for each of the remaining time slots belonging to correlation peak 602(1), to produce M projection vectors for correlation peak 602(1), only the first of which (604(1)) is shown in FIG. 6);

b. The energy occupying a first of the M time slots identified by correlation peak 602(2), to produce projection vector 604(2) (and also onto the energy in each of the remaining time slots belonging to correlation peak 604(2), to produce M projection vectors for correlation peak 602(2), only the first of which (604(2)) is shown in FIG. 6); and c. The energy occupying a first of the M time slots identified by correlation peak 602(3), to produce projection vector 604(3) (and also onto the energy in each of the remaining time slots belonging to correlation peak 602(3), to produce M projection vectors for correlation peak 602(3), only the first of which (604(3)) is shown in FIG. 6).

In FIG. 6, dotted lines link each correlation peak to its corresponding projection vector.

As seen in FIG. 6, side-by-side projection vectors 604(1)-604(3) for one of the M time slots (e.g., the first of the M time slots) collectively form a matrix 606 of user code projections for the one of the M time slots (e.g., the first of the M time slots) in which the projection vectors populate the columns of the matrix and the user code projections of the projection vectors populate the rows of the matrix. In FIG. 6, projection matrix 606 for only one of the M time slots is shown for purposes of descriptive simplicity, but it is understood that there will be a similar projection matrix for each of the M time slots. On the left-hand-side of matrix 606 corresponding to the y-axis, row indexes 1-16 identify user code projections (referred to as "PONS projections") for user codes UC1-UC16 for each projection vector. On the bottom of matrix 606 corresponding to the x-axis, finger indexes 1-3 identify the projection vectors 604(1)-604(3), respectively. That is, projection vectors 604(1)-604(3) are also referred to as "fingers" 1-3, respectively. In matrix 606, each user code projection has a value depicted in gray scale such that the higher the user projection value the lighter the gray scale, or the lower the value the darker the gray scale. On the right-hand-side of matrix 606, a vertical gray scale bar 608 maps user code projection values to corresponding gray scale values used in the matrix.

The gray scale of matrix 606 reveals a strong user code projection at row index #12 across projection vectors 604(1)-604(3), which corresponds to the transmitted user code UC12; however, noise and interference tends to reduce distinctiveness of the gray scale, and thus reduces the robustness of decoding that user code cleanly. According to the central limit theorem, late reflections leads to an apparent rise in the (non-correlated) noise-floor rather than interference.

As seen from FIG. 6, when synchronizing with a strongest cross-correlation peak (e.g., peak 602(1)), secondary (early) reflections (e.g., peaks 602(2) and 602(3)) may act as interferences, possibly reducing the likelihood of decoding the transmission (i.e., decoding the actually transmitted user code UC12) correctly. Moreover, transmit signals received concurrently from multiple transmitters in the same space (e.g., in room 106) may also add interference, making it even harder to decode the transmission from any one of the transmitters correctly. This is especially true when all of the concurrently transmitted signals employ the same pilot codes but carry different user codes synchronized to the pilot codes, as shown in FIG. 7.

Figure 7:
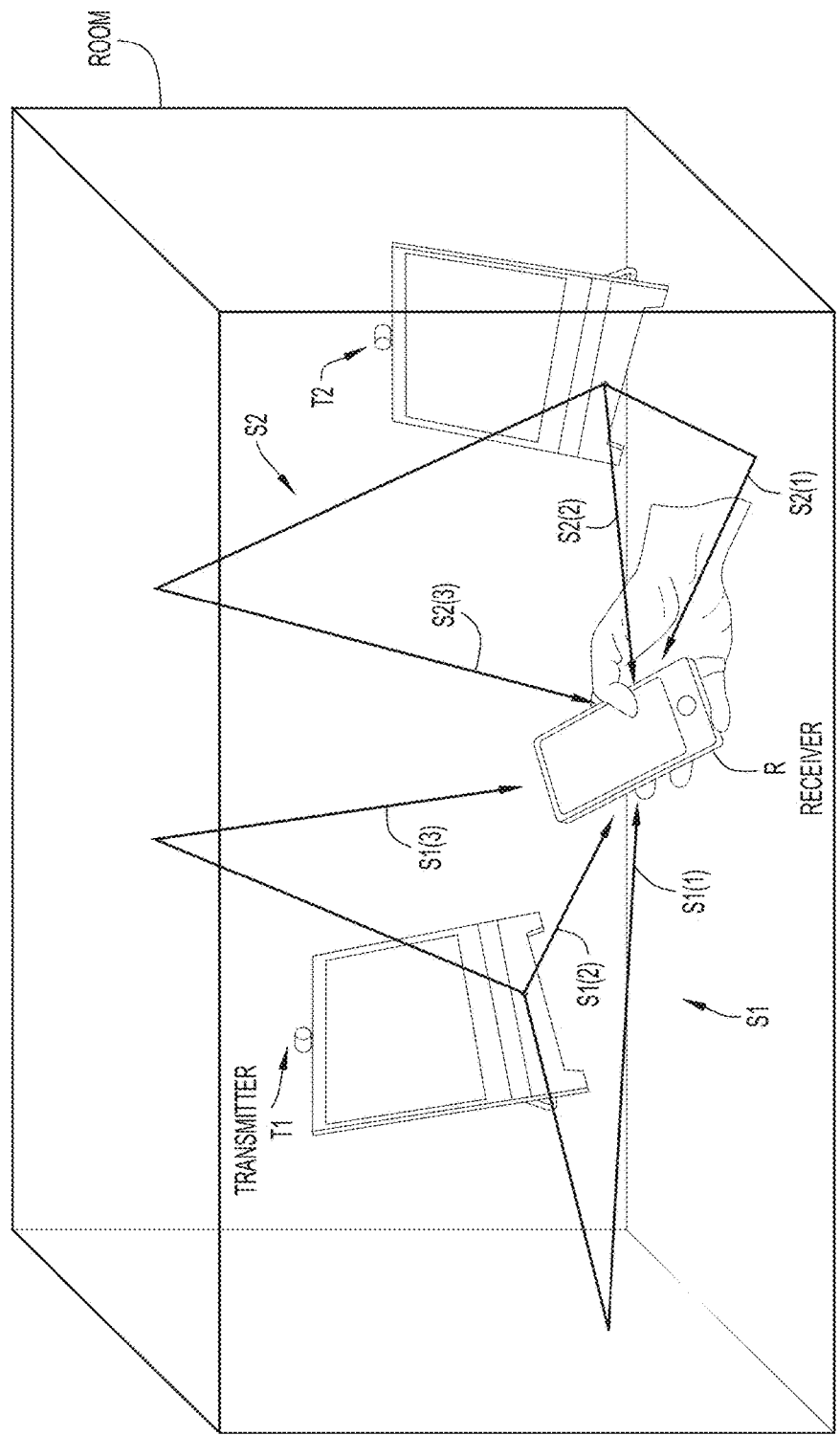
FIG. 7 is an illustration of a scenario in which two transmitters located in a room each transmit to a receiver respective spread spectrum signals, according to an example embodiment.

With reference to FIG. 7, there is an illustration of a scenario in which two transmitters T1 and T2 located in a room each transmit to spread spectrum receiver R respective spread spectrum signals S1 and S2. Spread spectrum signal S1 takes various paths S1(1)-S1(3) before reaching receiver R. Similarly, spread spectrum signal S2 takes various paths S2(1)-S2(3) before reaching receiver R. In reality, there may be a large number of signal paths, but only a few possible paths are depicted in FIG. 7 for clarity.

FIG. 8 is a plot of impulse responses for the energy associated with spread spectrum signals S1 and S2 arriving at receiver R. In FIG. 8, the energy peaks are labeled to indicate which signal produces which peak. FIG. 8 shows two impulse responses, one for signal set S1 and the other for signal set S2, shifted randomly with respect to each other due to transmitters T1 and T2 operating asynchronously with respect to each other.

FIG. 9 is an illustration of the correlation results (i.e., correlation magnitudes) produced by receiver R when the received energy follows the impulse response of FIG. 8. The correlation peaks C1(1)-C1(3) and C2(1)-C2(3) result from signals S1(1)-S1(3) and S2(1)-S2(3), respectively, as represented in the impulse responses of FIG. 8. The correlation results also show some "grunge." FIG. 9 also shows a projection matrix 904 produced by projector 318 based on the correlation peaks of FIG. 9. The user code projections of matrix 904 contain two clusters of consistently relatively large valued (i.e., large magnitude) user code projections across the projection vectors of the matrix, at row #1 and row #12, corresponding to transmitted user codes UC1 and UC12.

Embodiments presented herein synchronize the receiver (e.g., receiver 104) with a carefully selected subset of cross-correlation peaks, to make decoding of a spread spectrum signal transmitted from a single transmitter signal more robust. The embodiments also make it possible to simultaneously decode spread spectrum signals transmitted concurrently by multiple transmitters more robust.

A high-level description that forms the basis for decoding embodiments presented herein is now described. The receiver receives spread spectrum signals as described above, and produces cross-correlation (magnitude) peaks (referred to more simply as "peaks") from the signals. The receiver finds a subset of the peaks. For example, the receiver searches for the strongest peak, and then adds peaks that are close in time with the strongest peak. Since reflections decay quickly with time, only a limited window is used around the strongest peak to add in other peaks. For each found peak, the receiver selects signal samples for each time slot corresponding/belonging to the peak, performs complex equalization on the samples, and projects the result against individual ones of a known set of user codes. In this way, the receiver generates projection vectors for the peaks, e.g., one projection vector for each of M time slots/user codes per peak. For simplicity, processing of one time slot/user code is described below; however, it is understood that the processing is repeated for each time slot/user code. That is, the processing is repeated for each of M projection matrices corresponding to the M time slots/user codes.

The receiver optionally scales the user code projections of each projection vector using a constant factor for the projection vector, to produce a corresponding projection vector including scaled user code projections. The projection vector including the scaled user code projections may be referred to as a "scaled projection vector." In one example, to scale the user code projections, the receiver may multiply the user code projections of each projection vector by a magnitude of the peak corresponding to the projection vector, to produce, for each peak, a respective projection vector including the scaled user code projections. In another example, the receiver may multiply the user code projections of each projection vector by a signal-to-noise ratio (SNR) computed based on the user code projections in that projection vector.

The receiver selectively combines user code projections (which may or may not be scaled user code projections) of projection vectors across several peaks. Variations on how the receiver combines projection vectors are possible. In one example, to combine first and second projection vectors, the receiver pair-wise sums or adds user code projections of the first and second projection vectors at each row, to produce a combined projection vector. In this case, the user code projections in row #1 of the first and second projection vectors are summed to produce a combined user code projection in row #1 of the combined projection vector, the user code projections in row #2 of the first and second projection vectors are summed to produce a combined user code projection in row #2 of the combined projection vector, and so on, down all of the rows of the first and second projection vectors. Thus, each row of the combined projection vector includes a sum of user code projections from corresponding rows of the first and second projection vectors. This operation is referred to as vector adding the first and second projection vectors. Also, the combined projection vector is referred to as an aggregate projection vector that includes aggregate user code projections because each user code projection is an aggregate of multiple other user code projections.

The desired user code (i.e., the user code that was actually transmitted) tends to have a large magnitude in the corresponding user code projection (i.e., row) of each projection vector, while self-interference (or interference from another transmitter) tends to have a zero-mean, noise-like distribution among the user code projections. Thus, appropriate combining of multiple "fingers," (i.e., projection vectors, which may or may not include scaled user code projections) combats self-interfering reflections, even to the point that the reflections become a benefit to robust communication (through increased total SNR). This causes decoding to be far more resilient in scenarios with no main impulse response component, as can be the case in rooms with lots of glass/hard surfaces and shadowing attenuating the direct wave.

Although combining of the projection vectors across some of the peaks may increase overall SNR, not all peaks contribute positively to a more resilient decoding, for the following reasons:
 a. Some combinations of user codes at an "unfortunate" time offset may correlate with the pilot code, causing the formation of false peaks.
 b. Noise may by accident correlate with the pilot code.
 c. Peaks may be caused by a signal from an additional transmitter in the same space.

Due to the above reasons (a)-(c), adding user code projections of projection vectors across some of the peaks may actually reduce resilience, not enhance resilience, since, under certain circumstances, the user code projections contribute to interference. So, although combining user code projections at multiple peaks in general improves resilience, embodiments presented herein filter-out only the desired peaks (i.e., peaks that increase SNR), which improves resilience. This is referred to as "peak filtering." In addition, as describe below, the combining based on the peak filtering makes it possible to decode spread spectrum signals from multiple different transmitters simultaneously.

Figure 10:
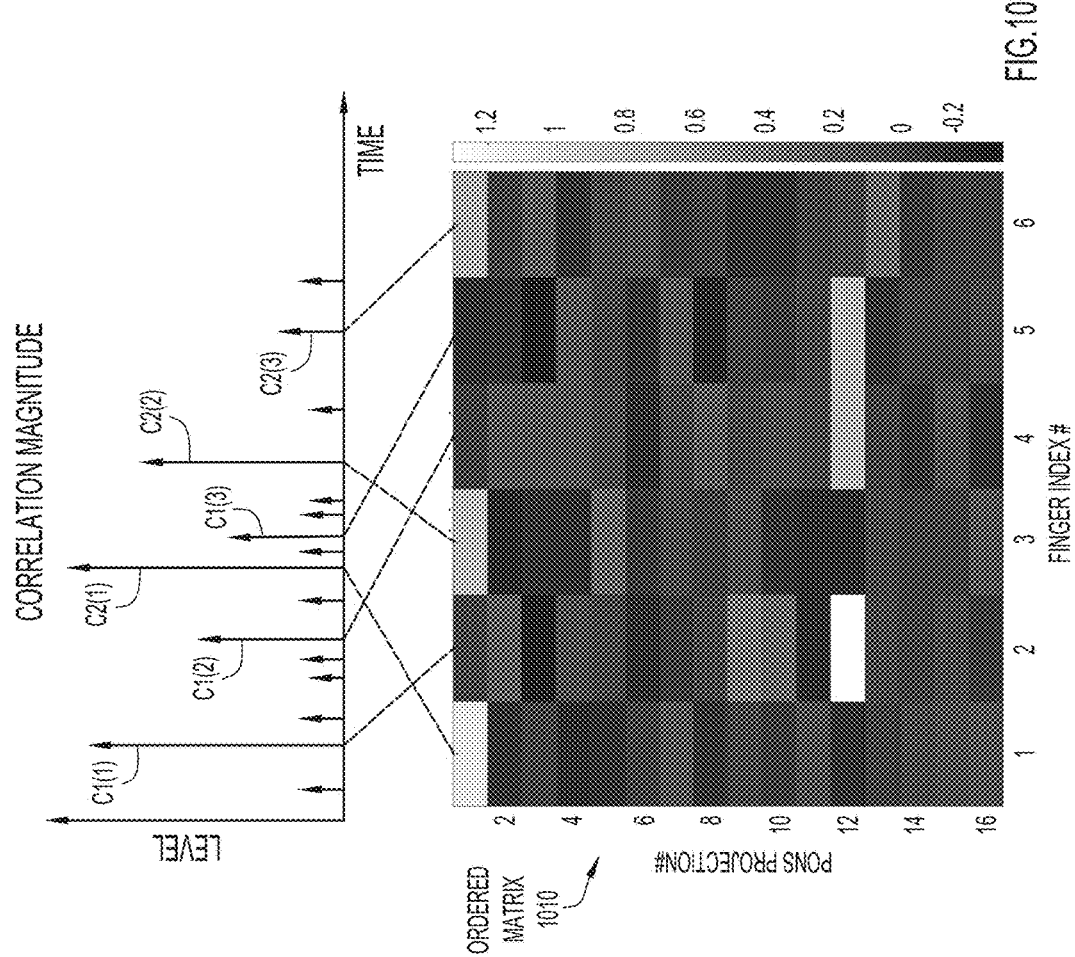
FIG. 10 is an illustration of the correlation results and the projection vectors from FIG. 9, but in which the projection vectors are reordered according to a descending order of correlation peak magnitudes, according to an example embodiment.

A first peak filtering method is now described in connection with FIGS. 9 and 10. Assuming the receiver has already produced cross-correlation peaks and their corresponding projection vectors in a matrix of user code projections, the receiver sorts the peaks in descending order of their magnitudes, i.e., in an order of descending peak magnitude. Then, the receiver orders the projection vectors of the matrix corresponding to the peaks in accordance with the order of the sorted peaks. For example, the receiver sorts the peaks shown in FIG. 9 in an order of descending magnitudes, and orders their corresponding projection vectors in accordance with the sorted order of the peaks, as shown in FIG. 10. That is, FIG. 10 is an illustration of the projection vectors from FIG. 9 sorted in the order of the descending magnitude of their peaks. The reordering of the projection vectors, indicated by a re-arrangement of the dotted lines linking the peaks to the projection vectors, results in an ordered matrix 1002, shown in FIG. 10. Essentially, the sorting operation rearranges the order of the projection vectors in the matrix. When sorting based on peaks, the largest single user code projection may not reside in the first projection vector.

After the sorting, the receiver optionally scales the user code projections of each projection vector, to produce respective projection vectors including scaled user code projections (i.e., a scaled projection vector). In the ensuing description, the term "projection vector" is broadly construed to cover both a projection vector that includes either scaled or unscaled user code projections. Similarly, the term "user code projection" covers, generally, both scaled and unscaled user code projections.

Next, the receiver establishes a signal quality metric (more simply referred to as a "quality metric") for how likely a user code projection in a given projection vector is correct, i.e., how likely it is that the user code projection represents the actual user code transmitted by the transmitter. Different quality metrics are possible. A first quality metric compares the strongest user code projection in a given projection vector with an average of all other user code projections in the given projection vector. For example, the receiver identifies the strongest user code projection in the given projection vector (i.e., the user code projection having a maximum value among all of the user code projections in the given projection vector), computes an average of all of the other user code projections in the given projection vector, and then computes a difference between (or a ratio of) the strongest user code projection and the average as the first quality metric. A second quality metric compares the strongest user code projection against the second strongest user code projection in the given projection vector. For example, the receiver may compute a difference between (or a ratio of) the strongest and second strongest user code projections in the given projection vector as the second quality metric.

Once the quality metric has been established, the receiver uses the quality metric in a traversal of the projection vectors in the following manner. The receiver computes the quality metric (i.e., measures the quality) of the first projection vector (e.g., projection vector #1 in ordered matrix 1002) corresponding to the largest peak, and stores/copies the first projection vector to an aggregate projection vector v. The receiver then traverse the projection vectors of the matrix (e.g., the ordered matrix 1002) sequentially, starting with the projection vector associated with the second to largest peak (e.g., projection vector #2 in ordered matrix 1002). Projection vector #2 becomes the "current projection vector" in the traversal.

The receiver combines the current projection vector with the aggregate projection vector v, and stores the resulting combined projection vector to a temporary combined projection vector v2.

The receiver computes the quality metrics of the aggregate projection vector v and the temporary combined projection vector v2.

If the quality metric for the temporary combined projection vector v2>quality metric for the aggregate projection vector v, the receiver copies the temporary combined projection vector v2 into the aggregate projection vector v. The selective combining of various projection vectors into aggregate projection vector v increases the SNR of the aggregate projection vector v relative to if the combining had not been performed.

The receiver repeats the above process for the next projection vector (which becomes the current projection vector in the next iteration) until all of the projection vectors are processed. Optionally, the iteration may stop early, i.e., before all of the projection vectors are traversed, if a predetermined stop condition is met. Examples of different stop conditions include a predetermined minimal peak (magnitude) or a predetermined minimum quality metric.

The end result is that user code projections in projection vectors that are combined into aggregate projection vector v that increase the confidence of the aggregate projection vector v (i.e., increase the confidence that one of the user codes indicated in a row of the first projection vector is the user code that was actually transmitted) will tend to be averaged in aggregate projection vector v. In the example of FIG. 10, the projection vectors that are selectively combined into the aggregate projection vector v include those projection vectors for peaks C2(1) (projection vector #1, i.e., finger index #1), C2(2) (projection vector #3), and C2(3) (projection vector #6) for transmitter T2, where peak C2(1) happens to correspond to the single largest peak. The process skipped over the other projections vectors, which were not combined into the aggregate projection vector v. Upon completing the traversal, the receiver selects the desired user code based on the aggregate user code projections of aggregate projection vector v. For example, the receiver identifies the row number of the maximum aggregate user code projection in the aggregate projection vector v, and uses that row index to identify the corresponding user code among the known user codes. That is, the maximum aggregate user code in the aggregate projection vector v is indicative of the user code that was actually transmitted.

Once the receiver has decoded the first transmitter using the above process, i.e., identified a first user code that was actually transmitted by the first transmitter (e.g., transmitter T2) based on the aggregate projection vector v, the receiver may decode a second transmitter, if present. To do this, the receiver repeats the process described above, beginning with the search for the strongest peak, but always avoids the peaks that were used (selected) to decode the user code from the first transmitter. In other words, the receiver identifies and traverses only the projection vectors that were skipped (i.e., not combined) when decoding the first user code, to generate a second aggregate projection vector indicative of a second user code transmitted by the second transmitter.

A second peak filtering method is now described. Assuming the receiver produced a set of n peaks, the receiver splits the set of n peaks into all possible 2^n−1 subsets that contain at least one peak. For each subset, the receiver combines the projection vectors of all the peaks in that subset. Then, for each of the user code time slots, the receiver selects the user code that appears in most subsets. In a variation, the receiver selects the user codes of the subset that has the most frequently used user codes. In another variation, the receiver uses a frequency of user code appearance as a quality metric, and combines it with other quality metrics as described in connection with peak filtering method 1, and then selects the subset with the highest quality.

Once the first transmitter has been decoded using the second peak filtering method, i.e., the first user code has been decoded, the receiver may decode the second transmitter, if present, as follows. The receiver has information about what the first transmitter sent, since the receiver decoded the user code transmitted by the first transmitter. The receiver also has a coarse estimate of major taps in its impulse response, since the taps correspond to the peaks used to decode the signal transmitted from the first transmitter. The receiver uses this information to create an estimate of the waveform received from the first transmitter, and subtracts the waveform from the aggregate waveform received at the receiver. This results in the waveform corresponding to the second transmitter, which the receiver may then decode. An advantage of the second filtering method is that interference from the first transmitter is reduced, which results in significantly improved resilience. On the other hand, an advantage of the first filtering method is that it is requires less computational power.

Figure 11:
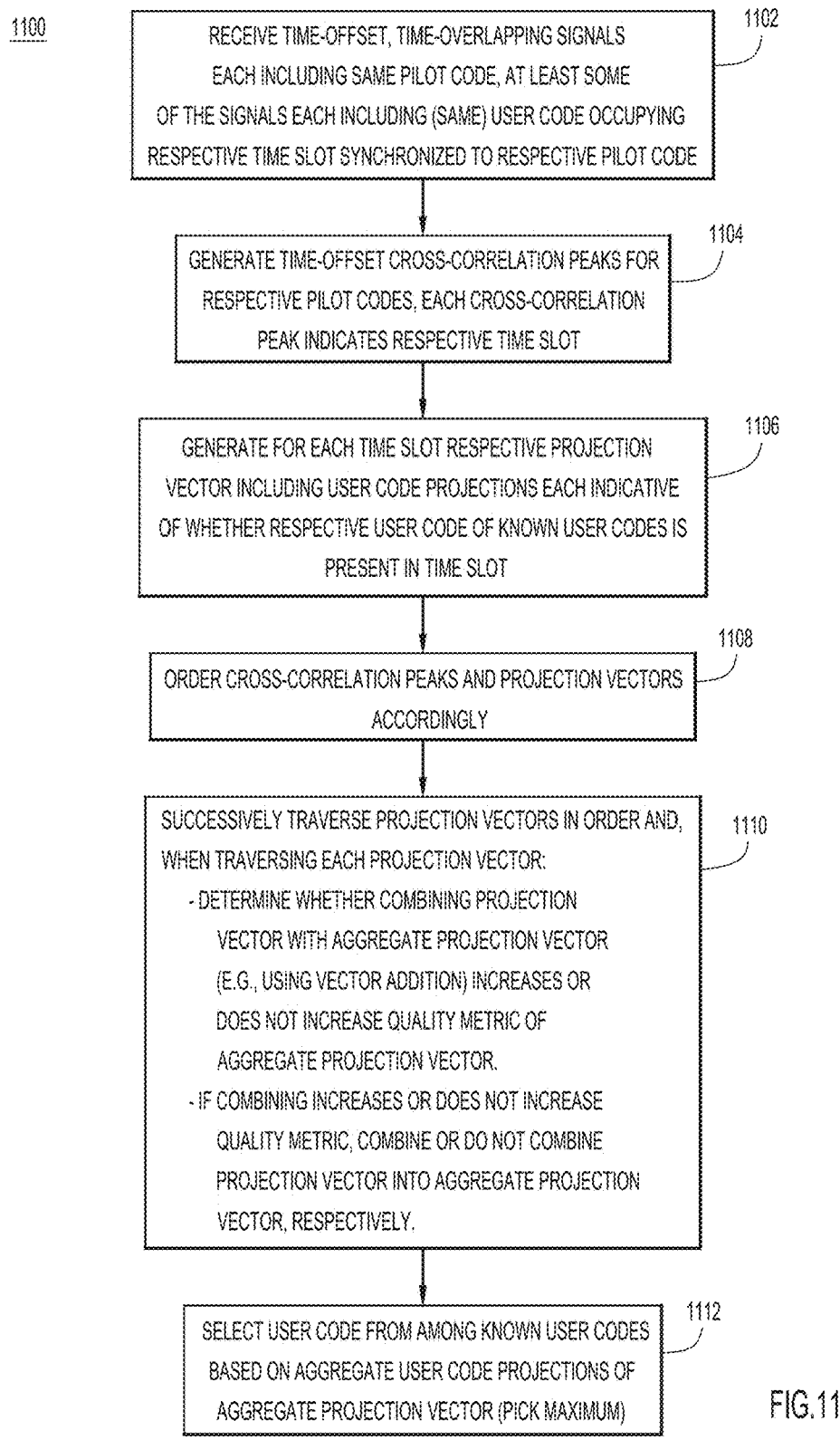
FIG. 11 is a flowchart of a method of decoding a user code from concurrent, time-offset, spread spectrum signals using peak filtering, according to an example embodiment.

With reference to FIG. 11, there is a flowchart of an example method 1100 of decoding spread spectrum signals using cross-correlation peak filtering. Method 1100 incorporates operations described above. The operations of method 1100 may be performed primarily by correlator assembly 310, projector 318, and projection processor 319 of receiver 104. Method 1100 is described in connection with recovering one user code per pilot code, by way of example only; it is understood that method 1100 may be repeated to recover, more generally, multiple user codes per pilot code.

At 1102, the receiver 104 receives time-overlapping acoustic spread spectrum signals that are time-offset from each other. Each signal includes/is encoded with a pilot code that is the same across all of the signals (as mentioned above, more generally, each signal is encoded with multiple (e.g., a set of M) user codes that are the same across all of the signals). At least some of the signals (i.e., first ones of the signals) each includes a user code (i.e., a first user code) that is the same across the at least some of the signals and that occupies a time slot time-synchronized to the pilot code for that signal. Each spread spectrum signal may be configured as shown in FIG. 2B, in which the pilot code and the user code may include respective PONS codes that are orthogonal to each other.

At 1104, the receiver 104 (e.g., correlator assembly 310) generates time-offset cross-correlation peaks corresponding to respective ones of the pilot codes of the signals. For example, the receiver 104 correlates the received signals with a replica of the pilot code, to produce the cross-correlation peaks. Each cross-correlation peak indicates timing for a corresponding one of the time slots occupied by a corresponding one of the user codes.

At 1106, the receiver 104 (e.g., projector 318) generates for each time slot a respective projection vector including user code projections. The user code projections are indicative of projections of individual known user codes onto energy occupying the time slot. Each user code projection is indicative of whether a respective one of the known user codes is present in the time slot. The user code projections may be scaled or unscaled user code projections.

At 1108, the receiver 104 orders or arranges the cross-correlation peaks in an order according to an ordering criterion. In one example, the receiver 104 orders the cross-correlation peaks in an order of decreasing magnitude. Alternatively, any known or hereafter developed clustering techniques may be used to order the cross-correlation peaks, or generate a subset/cluster of the cross-correlation peaks for use in subsequent operations of method 1100. The receiver 104 orders the projection vectors corresponding to the cross-correlation peaks according to the order of the cross-correlation peaks.

At 1110, the receiver 104 (e.g., projection processor 319) selectively combines particular ones of the projection vectors into an aggregate projection vector including aggregate user code projections, such that the aggregate projection vector has an SNR (based on its aggregate user code projections) greater than the projection vectors individually. To do this, the receiver 104 successively traverses the projection vectors in the order established at operation 1108 until all of the projection vectors have been traversed, or until a predetermined stop/terminal condition is reached. When traversing each (current) projection vector, the receiver 104 determines whether combining the (current) projection vector with the aggregate projection vector, into which previously traversed ones of the projection vectors have been combined beginning with the first projection vector, increases or does not increase a quality metric indicative of the SNR of the aggregate projection vector. For example, the receiver 104 determines whether the quality metric for the aggregate projection vector when combined with the current projection vector is greater than the quality metric for the aggregate projection vector when the current projection vector is not combined with the aggregate projection vector (i.e., before the current projection vector is combined with the aggregate projection vector). The quality metric may include the first or the second quality metrics described above, a combination of the two, or some other similar quality metric. To combine the current projection vector with the aggregate projection vector, the receiver 104 may pair-wise add user code projections from the current projection vector to corresponding aggregate user code projections of the aggregate projection vector, which may increase or decrease the corresponding aggregate user code projection depending on the value of the user code projection. This is a vector addition operation, i.e., vector adding of the user code projections of a given projection vector to the corresponding aggregate user code projections of the aggregate projection vector. If the receiver 104 determines that the combining increases or does not increase the quality metric, the receiver 104 combines or does not combine the vector with the aggregate projection vector, respectively.

The receiver 104 may traverse all of the projection vectors in the prescribed order. Alternatively, the receiver 104 may terminate the traversal when a predetermined terminal condition is met. Terminal conditions include, but are not limited to: the quality metric exceeding a predetermined threshold, or falling below a predetermined threshold; and a magnitude of a peak corresponding to the current projection vector being traversed being below/less than a predetermined threshold.

At 1112, upon completing the traversal of operation 1110, the receiver 104 (e.g., projection processor 319) determines the user code (that was actually transmitted) based on the aggregate user code projections of the aggregate projection vector. For example, the receiver 104 selects the user from among the known user codes based on the aggregate user code projections of the aggregate projection vector. In one example, the receiver 104 identifies a row index of a maximum one of the aggregate user code projections in the aggregate projection vector, and uses the row index to select the user code among the known user codes.

The signals received in operation 1102 may include the first signals and second signals (i.e., other ones of the signals that are not among the at least some signals). The second signals may include the same pilot code as the first signals, but may each include a second user code occupying a time slot time-synchronized to a respective one of the pilot codes for the second signals. Once the receiver 104 has recovered the user code associated with the first signals according to method 1100, the receiver 104 may then recover the second user code as follows. The receiver 104 repeats operation 1110, but in doing so, successively traverses, in order, only the projection vectors that were not combined into the aggregate projection vector, to produce a second aggregate projection vector of second aggregate user code projections. Then, the receiver 104 selects the second user code based on the second aggregate user code projections similar to way the receiver 104 selected the user code based on the aggregate user code projections.

Figure 12:
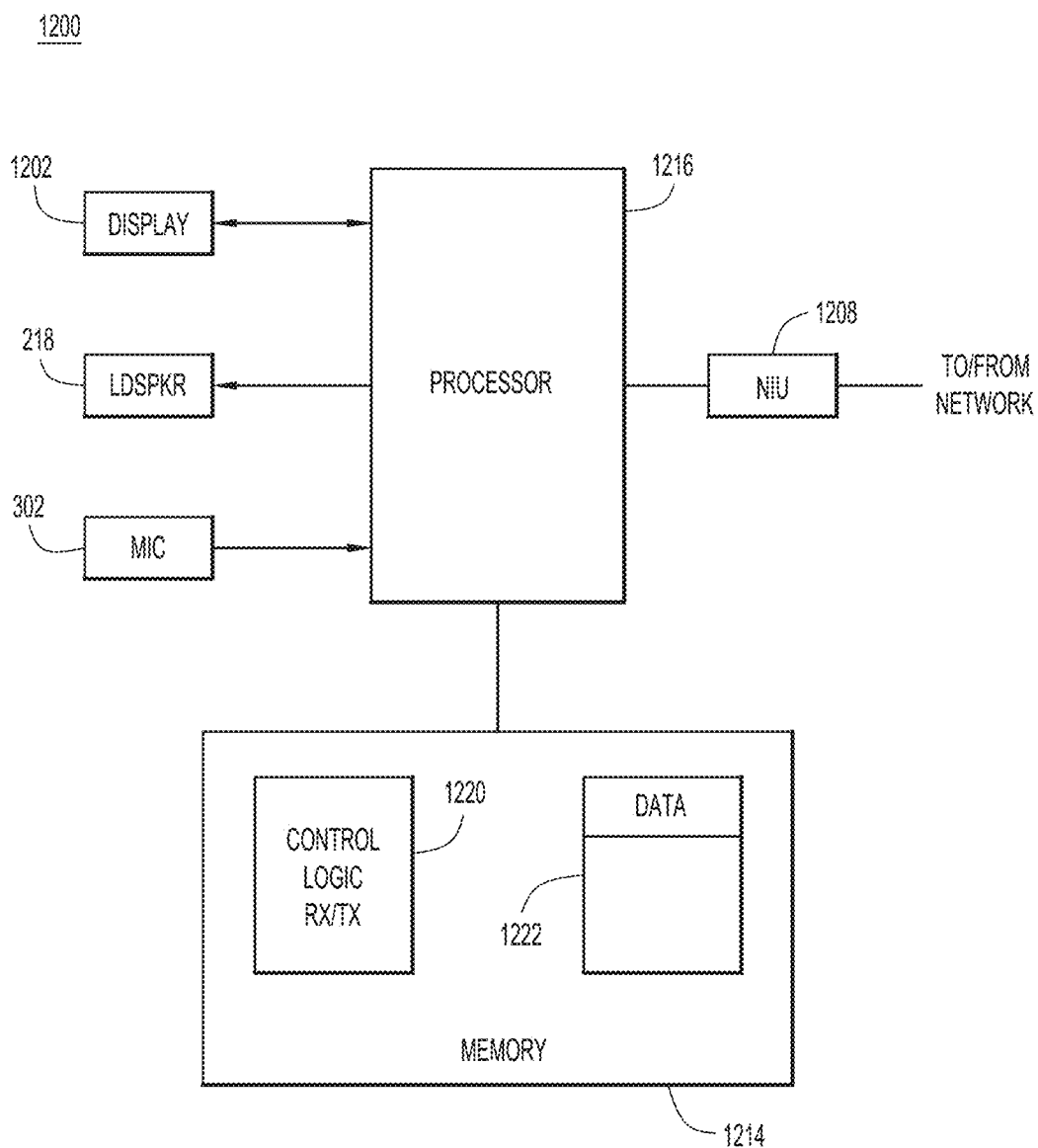
FIG. 12 is a block diagram of a communication device in which the spread spectrum acoustic transmitter and the spread spectrum acoustic receiver may be implemented, according to an example embodiment

With reference to FIG. 12, there is a block diagram of an example communication device 1200 in which TX 102, RX 104, or both may be implemented. There are numerous possible configurations for device 1200 and FIG. 12 is meant to be an example. Examples of device 1200 include a tablet computer, a personal computer, a laptop computer, a mobile phone, such as a smartphone, or a video conference endpoint. Device 1200 may include a display 1202, loudspeaker 218, microphone 302, one or more network interface units (NIUs) 1208, and memory 1214 each coupled to a processor 1216. The one or more NIUs 1208 may include wired and/or wireless connection capability that allows processor 1216 to communicate over a communication network. For example, NIUs 1208 may include an Ethernet card to communicate over an Ethernet connection, a wireless RF transceiver to communicate wirelessly with cellular networks in the communication network, optical transceivers, audio (e.g., ultrasound) transceivers, and the like, as would be appreciated by one or ordinary skill in the relevant arts. Microphone 302 and NIU 1208 represent examples of signal receivers to receive signals including audio, RF, optical, and/or other types of signals over wireless or wired connections, and to provide the received signals to processor 1216 directly, or in pre-processed form (e.g., in transduced form in the case of microphone 302).

Processor 1216 may include a collection of microcontrollers and/or microprocessors, for example, each configured to execute respective software instructions stored in the memory 1214. The collection of microcontrollers may include, for example: a video controller to receive, send, and process video signals or images related to display 1202; an audio processor to receive, send/transmit, and process audio/sound signals related to loudspeaker 218 and microphone 302 as described herein; and a high-level controller to provide overall control. Portions of memory 1214 (and the instructions therein) may be integrated with processor 1216. As used herein, the terms "audio" and "sound" are synonymous and interchangeable.

The memory 1214 may include read only memory (ROM), random access memory (RAM), magnetic disk storage media devices, optical storage media devices, flash memory devices, electrical, optical, or other physical/tangible (e.g., non-transitory) memory storage devices. Thus, in general, the memory 1214 may comprise one or more computer readable storage media (e.g., a memory device) encoded with software comprising computer executable instructions and when the software is executed (by the processor 1216) it is operable to perform the operations described herein. For example, the memory 1214 stores or is encoded with instructions for control logic 1220 to perform operations described herein related to TX 102 and RX 104.

In addition, memory 1214 stores data/information 1222 used and generated by logic 1220, such information describing cross-correlation peaks, projection vectors, aggregate projection vectors, PONS codes for pilot codes and user codes, and so on.

In summary, embodiments presented herein use acoustic reflections to amplify spread spectrum signals at a receiver, thereby increasing SNR at the receiver and making decoding of the signals possible in more challenging acoustic environments. Embodiments also extract received signal contributions from individual transmitters, thereby making it possible to decode signals from multiple simultaneous transmitters, simultaneously, even when the signals user the same protocol, frequency, and pilot code, and are not synchronized. This results in some combination of a better pairing experience between ultrasound transmitters and receivers and less user exposure to ultrasound.

In one form, a method is provided comprising: receiving time-offset, time-overlapping signals each including a pilot code that is the same across the signals, at least some of the signals each further including a user code occupying a time slot time-synchronized to a respective one of the pilot codes; generating time-offset cross-correlation peaks for respective ones of the pilot codes, each cross-correlation peak indicating a respective one of the time slots; generating for each time slot a respective projection vector including user code projections each indicative of whether a respective user code among known user codes is present; selectively combining particular ones of the projection vectors into an aggregate projection vector of aggregate user code projections, such that the aggregate projection vector has a signal-to-noise ratio (SNR) greater than the projection vectors individually; and selecting the user code from among the known user codes based on the aggregate user code projections of the aggregate projection vector.

In one form, an apparatus is provided comprising: a signal receiver to receive time-offset, time-overlapping signals each including a pilot code that is the same across the signals, at least some of the signals each further including a user code occupying a time slot time-synchronized to a respective one of the pilot codes; and a processor coupled to the signal receiver and configured to perform: generating time-offset cross-correlation peaks for respective ones of the pilot codes, each cross-correlation peak indicating a respective one of the time slots; generating for each time slot a respective projection vector including user code projections each indicative of whether a respective user code among known user codes is present; selectively combining particular ones of the projection vectors into an aggregate projection vector of aggregate user code projections, such that the aggregate projection vector has a signal-to-noise ratio (SNR) greater than the projection vectors individually; and selecting the user code from among the known user codes based on the aggregate user code projections of the aggregate projection vector.

In yet another form, a non-transitory computer readable medium encoded with instructions is provided. The instructions, when executed by a processor, cause the processor to perform receiving from a signal receiver time-offset, time-overlapping signals each including a pilot code that is the same across the signals, at least some of the signals each further including a user code occupying a time slot time-synchronized to a respective one of the pilot codes; generating time-offset cross-correlation peaks for respective ones of the pilot codes, each cross-correlation peak indicating a respective one of the time slots; generating for each time slot a respective projection vector including user code projections each indicative of whether a respective user code among known user codes is present; selectively combining particular ones of the projection vectors into an aggregate projection vector of aggregate user code projections, such that the aggregate projection vector has a signal-to-noise ratio (SNR) greater than the projection vectors individually; and selecting the user code from among the known user codes based on the aggregate user code projections of the aggregate projection vector.

The above description is intended by way of example only. Various modifications and structural changes may be made therein without departing from the scope of the concepts described herein and within the scope and range of equivalents of the claims.

What is claimed is:

1. A method comprising:
   receiving time-offset, time-overlapping signals each including a pilot code that is the same across the signals, at least some of the signals each further including a user code occupying a time slot time-synchronized to a respective one of the pilot codes;
   generating time-offset cross-correlation peaks for respective ones of the pilot codes, each cross-correlation peak indicating a respective one of the time slots;
   generating for each of the time slots a respective projection vector including user code projections each indicative of whether a respective user code among known user codes is present;
   selectively combining particular ones of the projection vectors into an aggregate projection vector of aggregate user code projections, such that the aggregate projection vector has a signal-to-noise ratio (SNR) greater than the projection vectors individually; and
   selecting the user code from among the known user codes based on the aggregate user code projections of the aggregate projection vector.

2. The method of claim 1, wherein the selectively combining includes vector adding the user code projections of each of the particular ones of the projection vectors to the aggregate user code projections of the aggregate projection vector.

3. The method of claim 1, wherein the selectively combining includes successively traversing the projection vectors and, when traversing each projection vector:
   determining whether combining the projection vector with the aggregate projection vector increases or does not increase a quality metric of the aggregate projection vector indicative of the SNR of the aggregate projection vector; and
   if the combining increases or does not increase the quality metric, combining or not combining the projection vector into the aggregate projection vector, respectively.

4. The method of claim 3, wherein the selectively combining further comprises:
   determining the quality metric based on a maximum one of the aggregate user code projections and one or more other aggregate user code projections of the aggregate projection vector.

5. The method of claim 3, further comprising:
arranging the cross-correlation peaks in an order according to an ordering criteria,
wherein the successively traversing includes successively traversing the projection vectors in the order of the cross-correlation peaks.

6. The method of claim 3, wherein the successively traversing includes successively traversing all of the projection vectors produced by the generating for each time slot the respective projection vector.

7. The method of claim 3, further comprising, before successively traversing all of the projection vectors produced in the generating, terminating the successively traversing when a predetermined terminal condition is met.

8. The method of claim 3, wherein the receiving includes receiving the signals such that other ones of the signals, that are not among the at least some of the signals, each further includes a second user code occupying a time slot time-synchronized to a respective one of the pilot codes for the other ones of the signals, the method further comprising:
repeating the successively traversing using only the projection vectors that were not combined into the aggregate projection vector, to produce a second aggregate projection vector of second aggregate user code projections; and
selecting the second user code based on the second aggregate user code projections.

9. The method of claim 1, wherein the generating for each time slot the respective projection vector including user code projections includes generating each user code projection such that the user code projection is indicative of a projection of a respective one of the known user codes onto energy of the time slot.

10. The method of claim 1, wherein the generating for each time slot the respective projection vector including user code projections includes:
individually projecting the known user codes onto energy in the time slot, to produce respective projection values; and
scaling each projection value based on a common factor to produce the user code projections of the respective projection vector.

11. The method of claim 1, wherein the pilot code and the user code are each based on one or more Prometheus Orthonormal Set (PONS) codes.

12. The method of claim 1, wherein the selecting includes selecting as the user code the user code among the known user codes corresponding to a maximum one of the aggregate user code projections of the aggregate projection vector.

13. An apparatus comprising:
a signal receiver to receive time-offset, time-overlapping signals each including a pilot code that is the same across the signals, at least some of the signals each further including a user code occupying a time slot time-synchronized to a respective one of the pilot codes; and
a processor coupled to the signal receiver and configured to perform:
generating time-offset cross-correlation peaks for respective ones of the pilot codes, each cross-correlation peak indicating a respective one of the time slots;
generating for each of the time slots a respective projection vector including user code projections each indicative of whether a respective user code among known user codes is present;
selectively combining particular ones of the projection vectors into an aggregate projection vector of aggregate user code projections, such that the aggregate projection vector has a signal-to-noise ratio (SNR) greater than the projection vectors individually; and
selecting the user code from among the known user codes based on the aggregate user code projections of the aggregate projection vector.

14. The apparatus of claim 13, wherein the processor is configured to perform the selectively combining by vector adding the user code projections of each of the particular ones of the projection vectors to the aggregate user code projections of the aggregate projection vector.

15. The apparatus of claim 13, wherein the processor is configured to perform the selectively combining by successively traversing the projection vectors and, when traversing each projection vector:
determining whether combining the projection vector with the aggregate projection vector increases or does not increase a quality metric of the aggregate projection vector indicative of the SNR of the aggregate projection vector; and
if the combining increases or does not increase the quality metric, combining or not combining the projection vector into the aggregate projection vector, respectively.

16. The apparatus of claim 15, wherein the selectively combining further comprises:
determining the quality metric based on a maximum one of the aggregate user code projections and one or more other aggregate user code projections of the aggregate projection vector.

17. The apparatus of claim 15, further comprising:
arranging the cross-correlation peaks in an order according to an ordering criteria,
wherein the successively traversing includes successively traversing the projection vectors in the order of the cross-correlation peaks.

18. A non-transitory computer readable medium encoded with instruction that, when executed by a processor, cause the processor to perform:
receiving from a signal receiver time-offset, time-overlapping signals each including a pilot code that is the same across the signals, at least some of the signals each further including a user code occupying a time slot time-synchronized to a respective one of the pilot codes;
generating time-offset cross-correlation peaks for respective ones of the pilot codes, each cross-correlation peak indicating a respective one of the time slots;
generating for each of the time slots a respective projection vector including user code projections each indicative of whether a respective user code among known user codes is present;
selectively combining particular ones of the projection vectors into an aggregate projection vector of aggregate user code projections, such that the aggregate projection vector has a signal-to-noise ratio (SNR) greater than the projection vectors individually; and
selecting the user code from among the known user codes based on the aggregate user code projections of the aggregate projection vector.

19. The non-transitory computer readable medium of claim 18, wherein the instructions to cause the processor to perform the selectively combining include instructions to cause the processor to perform vector adding the user code projections of each of the particular ones of the projection vectors to the aggregate user code projections of the aggregate projection vector.

20. The non-transitory computer readable medium of claim 18, wherein the instructions to cause the processor to perform the selectively combining include instructions to cause the processor to perform successively traversing the projection vectors and, when traversing each projection vector:
- determining whether combining the projection vector with the aggregate projection vector increases or does not increase a quality metric of the aggregate projection vector indicative of the SNR of the aggregate projection vector; and
- if the combining increases or does not increase the quality metric, combining or not combining the projection vector into the aggregate projection vector, respectively.

* * * * *